Figure 1:
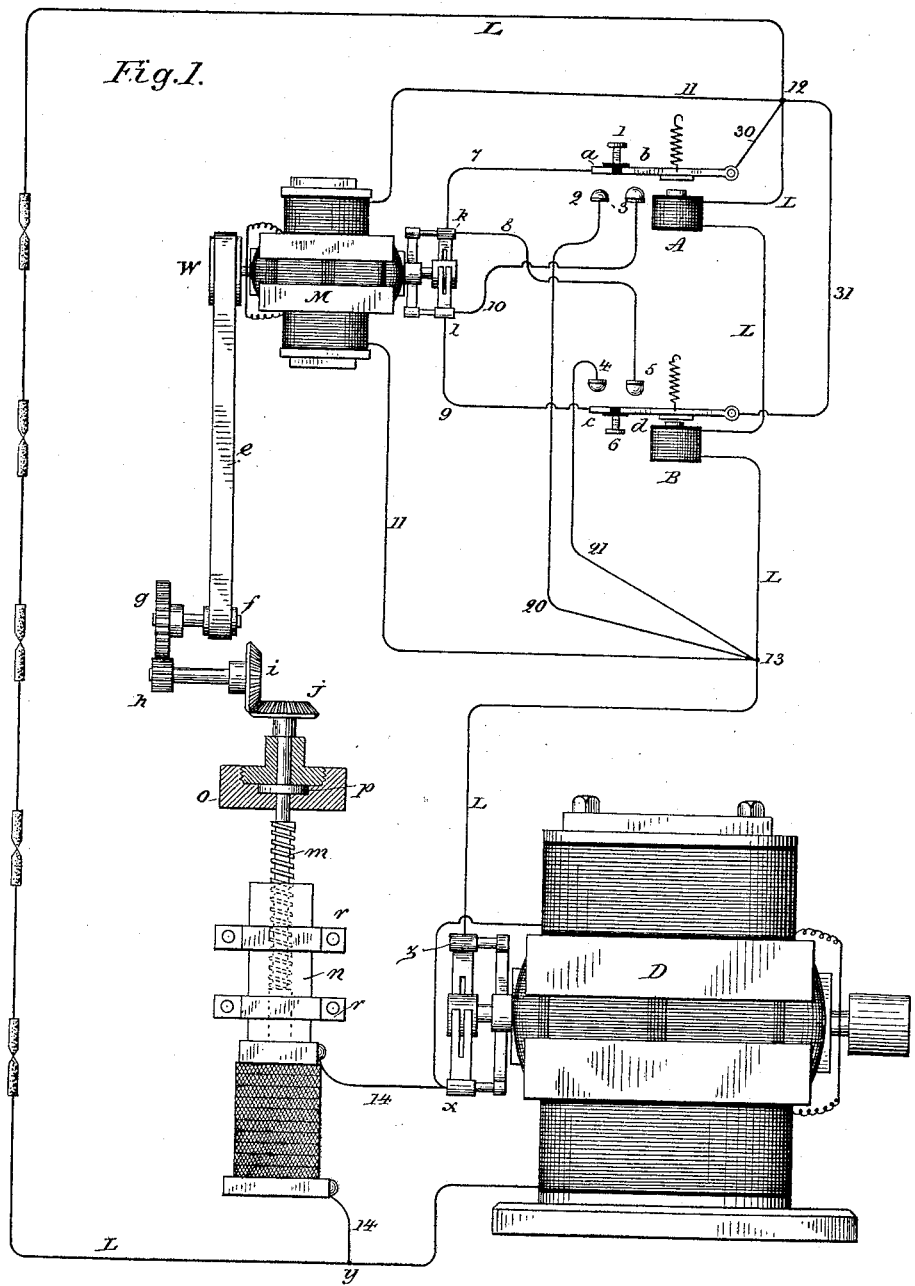

(No Model.) 3 Sheets—Sheet 1.

C. L. BUCKINGHAM.
REGULATOR FOR DYNAMO ELECTRIC MACHINES.

No. 320,842. Patented June 23, 1885.

Witnesses:
Ernest Abshagen
R. L. Matters

Inventor:
C. L. Buckingham (No Model.)
3 Sheets—Sheet 2.

C. L. BUCKINGHAM.
REGULATOR FOR DYNAMO ELECTRIC MACHINES.

No. 320,842.  Patented June 23, 1885.

Witnesses:
Ernest Abshagen

Inventor:
C. L. Buckingham

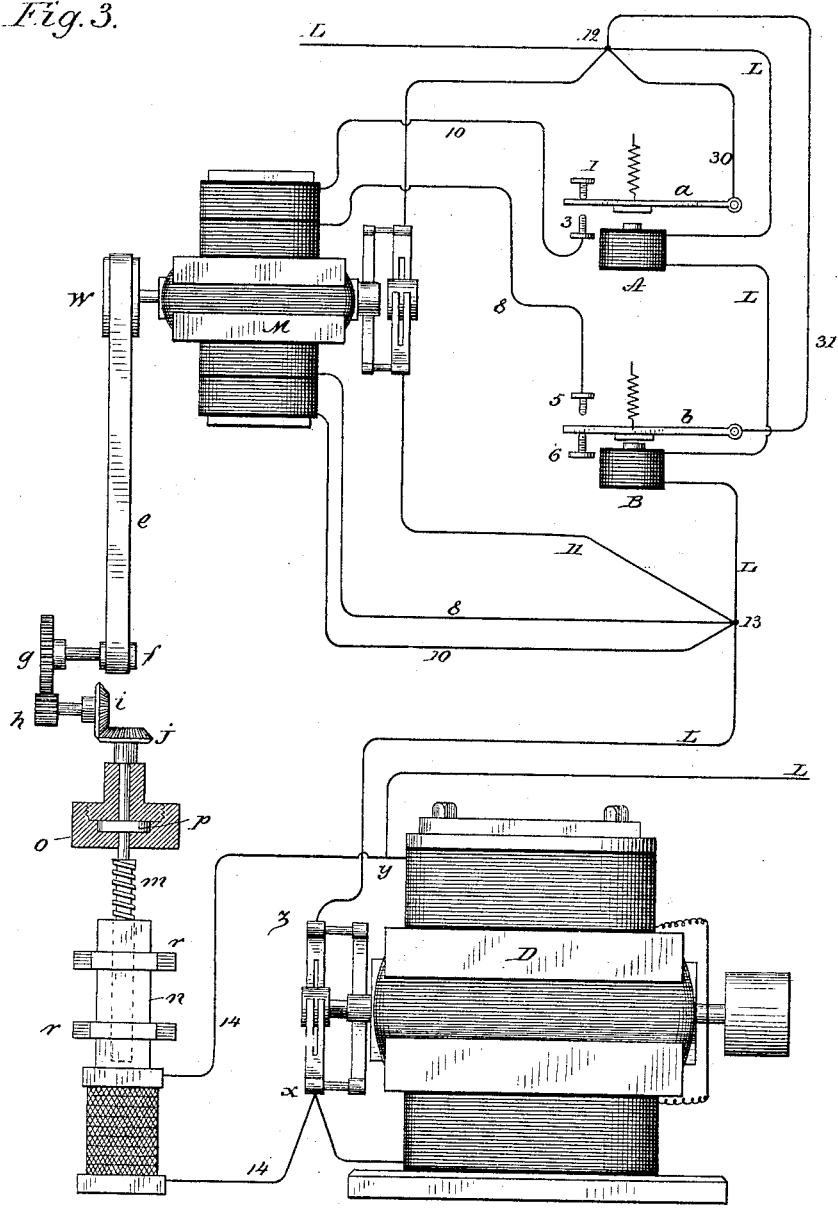

UNITED STATES PATENT OFFICE.

CHARLES L. BUCKINGHAM, OF NEW YORK, N. Y.

REGULATOR FOR DYNAMO-ELECTRIC MACHINES.

SPECIFICATION forming part of Letters Patent No. 320,842, dated June 23, 1885.

Application filed December 13, 1884. (No model.)

*To all whom it may concern:*

Be it known that I, CHARLES L. BUCKINGHAM, of the city, county, and State of New York, a citizen of the United States of America, have invented a new and useful device for regulating the electro-motive force of dynamo-electric machines to correspond with the work to be performed in an electrical circuit which is supplied with electricity from said dynamo-electric machine.

My invention relates to that class of regulators in which the electro-motive force of the dynamo-machine is varied by short-circuiting its field-coils; and it consists in an electro-magnetic motor for varying the shunt resistance of the fields of the dynamo, the armature of which is normally stationary, but which is rotated in one direction or the other, according as the current in the working-circuit increases above a certain strength or falls below the desired amount.

The main line or working-circuit is provided with two electro-magnets whose armatures are differently adjusted, and so that with a normal current in the working-circuit the armature of one electro-magnet is held at front contact, while the armature of the other electro-magnet is held at back contact. While the two armatures are thus held the electric motor is rendered inoperative and its armature remains stationary. Upon an increase of current in the working-circuit above that required the armature normally resting at back contact is attracted to a forward position, and the armature of the electric motor is rotated, thus causing the resistance in the field-shunt to be decreased and the electro-motive force of the generator diminished. Upon a decrease of current in the working-circuit below that normally required the armature normally resting at front contact no longer remains attracted by its electro-magnet, and the armature of the motor is rotated in the opposite direction, thus increasing the resistance of the field-shunt and increasing the electro-motive force of the machine until the current in the working-circuit has again attained a desired strength.

The motor-armature may be so controlled as to remain stationary under normal conditions or rotate in either direction through several different arrangements of apparatus and electrical circuits.

First, the field-magnets of the regulator-motor may be included in the main line or in a normally-closed branch thereof, and the armature-circuit may be normally broken; but it may be closed by the operation of one of the two working-circuit electro-magnets in such manner as to direct a portion of the main line current through said armature in one direction, thereby causing the motor-armature to rotate in a direction corresponding thereto, and the armature-circuit may also be independently closed by the second working-circuit electro-magnet in such manner as to direct a current derived from said working-circuit through the motor-armature in the opposite direction, thereby causing said armature to rotate in the opposite direction.

Second, the circuit of the motor-armature may be normally closed and form a part either of the main line or a branch derived therefrom, while the circuit of the field-magnets of said motor may be normally broken, and may be independently closed by either of the working-circuit electro-magnets, thereby transmitting a current of either polarity through them to cause rotation in either direction desired.

Third, the armature-circuit, as in the preceding case, may normally remain closed, and the field-magnets of the regulator-motor may be differentially wound with two coils, which may be separately and respectively closed by the two working-circuit electro-magnets, thereby causing field magnetism of either polarity to be produced according as it is desired to rotate the motor-armature in one direction or the other.

It is well known that with the same arrangement of field magnetism the armature of an electric motor will rotate in either direction, according to the direction of current passing through the armature; also, that if the current in the armature is maintained in the same direction the armature will be rotated in one direction or the other, according to the arrangement of field magnetism. Thus it will be seen that to reverse the direction of rotation of the armature it is only necessary to reverse the direction of current through the armature or through the field-magnets.

Figure 2:
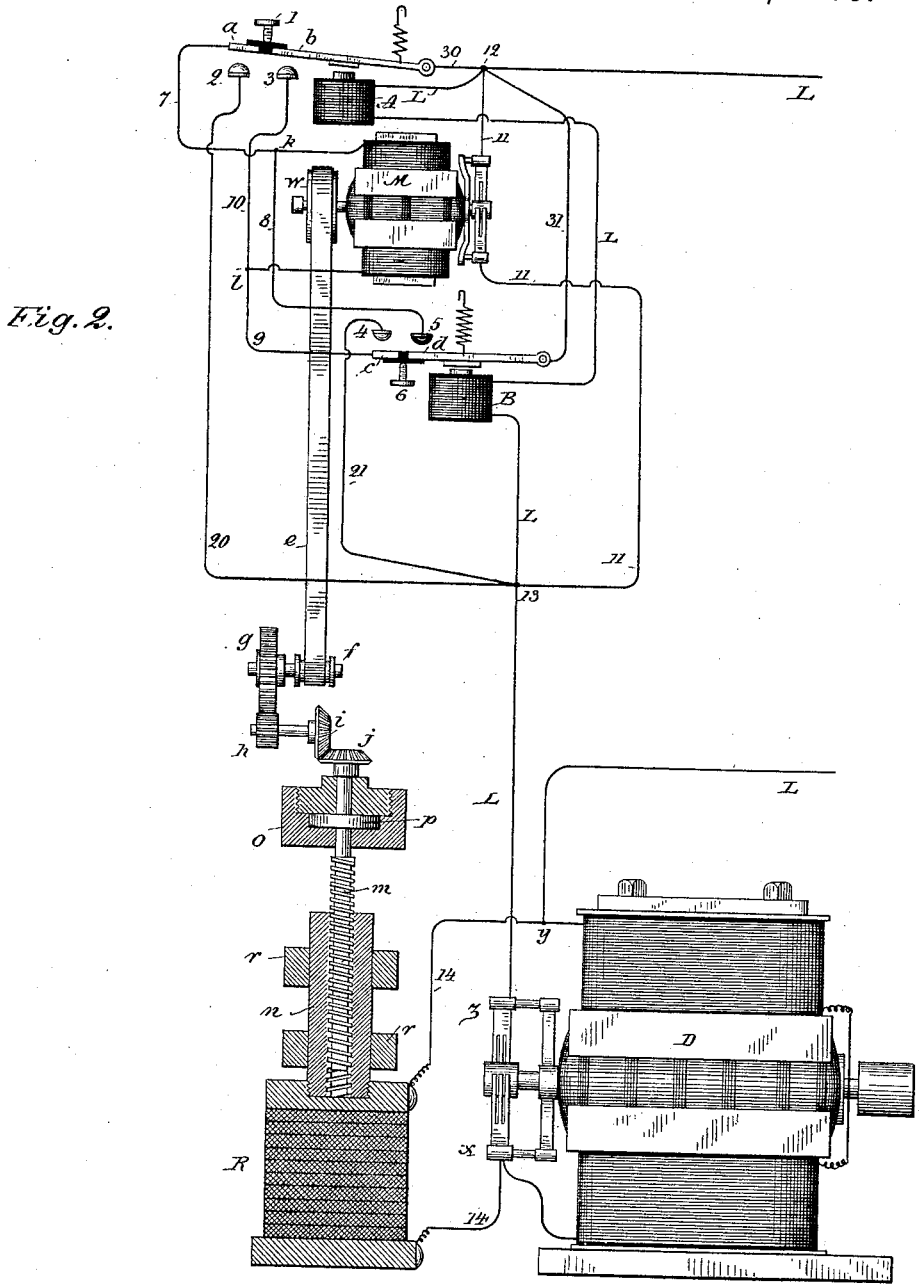

Figure 1 is a diagram showing means for directing a current of either polarity through the armature of the regulating-motor while a continuous current of one polarity is maintained through the field-magnets. Fig. 2 is a diagram showing means for directing a current of either polarity through the single field-coil of the regulating-motor while a continuous current of one polarity is maintained through the armature. Fig. 3 is a diagram showing a regulating-motor whose field-magnets are differentially wound with two normally-open coils, and means for closing either of said branches, whereby the field-magnetism of the motor may be inverted while a continuous current of one polarity is directed through the armature.

In Fig. 1, L is a working-circuit, including a dynamo-machine, D, whose field and armature coils are connected together in series, as shown, and A B are two electro-magnets, whose respective armature-levers are differently adjusted by their retracting-springs, and are normally held, one against back contact, 1, by its retracting-spring and the other against front contact, 6, its retracting-spring being too weak to overcome the magnetic attraction due to the normal current in the working-circuit.

The armature-lever of A is made up of two insulated parts, $a\ b$, and $a$ is permanently connected to commutator-brush $k$ by wire 7, while $b$ is connected to point 12 of line L by wire 30. This armature-lever is provided with an upper insulated stop, 1, and two lower electrical contacts, 2 3, against which $a\ b$ respectively come in contact when in their lower position. Contact 2 is connected to point 13 of line L by wire 20, and contact 3 with commutator-brush $l$ by wire 10.

In like manner armature-lever B is made up of two insulated parts, $c\ d$, and $c$ is permanently connected to commutator-brush $l$ by wire 9, while $d$ is connected to point 12 of line L by wire 31. This armature-lever is provided with a lower insulated stop, 6, and two upper electrical contacts, 4 5, against which $c\ d$ respectively come in contact when in their upper position. Contact 4 is connected to point 13 of line L by wire 21, and contact 5 with commutator-brush $k$ by wire 8. The field-magnets of the regulating-motor are wound by a single coil, included in the constantly-closed branch 11, joining the main line L at points 12 and 13.

While the armature-lever of A is in its upper position and the armature-lever of B is in its lower position, the circuit through the armature of the regulating-motor is broken. If, however, the armature-lever of A is drawn against contacts 2 3 by an abnormally strong current in line L, the armature-lever of B remaining in its lower position a circuit through the motor-armature will be completed from point 12 through wire 30 $b$, contact 3, wire 10, commutator-brush $l$, armature of motor M, commutator-brush $k$, wire 7, contact 2, and wire 20 to point 13, thus closing the armature-circuit of the motor, and causing a current to flow through said armature from brush $l$ to brush $k$. On the other hand, if instead of an abnormal strengthening of the current in L it becomes unduly weakened, the armature-lever of A will remain in its upper position, and the armature-lever of B will also be retracted by its spring, and a circuit through the motor-armature will be closed from 12 on line L through wire 21 $d$, contact 5, wire 8, commutator-brush $k$, the armature of motor M, commutator-brush $l$, wire 9 $c$, contact 4, and wire 21, to point 13 of line L, thus closing the armature-circuit of the motor, and causing a current to flow through said armature from brush $k$ to brush $l$.

From the foregoing it will be seen that there are two normally-open main-line branches joining points 12 and 13, and that the armature of the regulating-motor may be inserted in either of said branches, and that when said motor-armature is inserted in one branch a current will flow through it in one direction, and that when inserted in the other branch a current will flow through said motor-armature in the opposite direction, and that the motor-armature is inserted in one branch with an abnormal increase of current in the working-circuit, and is inserted in the other branch with a decrease in the current of said circuit below a normal and required strength.

To the motor-armature a train of gear, $f\ g\ h\ i\ j$, is connected by wheel $w$ and belt $e$, which is employed to vary the pressure and resistance of R, placed in a wire, 14, thus forming a variable resistance-shunt around the field-magnets of dynamo-machine D, as will be seen by tracing the current L to brush $z$, thence through the armature to brush $x$, where it divides, reuniting at $y$, the field-magnets being in one branch and the shunt comprising the other.

Male screw $m$ is provided with a collar, $p$, which is mounted in a bearing, $o$, thus preventing longitudinal movement, while female screw $n$ is placed in longitudinal guides $r$, which prevent its rotation but permit a longitudinal movement as $m$ is rotated to compress or remove pressure from the carbon pile R. Instead of employing as a variable resistance a carbon pile, of course any ordinary rheostat, as a series of resistance-coils one or all of which can be thrown into or out of circuit by the train of gear controlled by motor M and a switch-arm capable of to-and-fro movement, may be used. The resistance of main line L, between points 12 and 13, must be sufficient to cause enough current to be diverted into the regulating-motor to effect its prompt operation, and more resistance may be added to that of the coils of electro-magnets A B, if required.

In Fig. 2 I have shown the identical arrangement of apparatus and circuits set forth in the preceding description, excepting that the constantly-closed wire 11 in Fig. 2 includes the armature of the regulating-motor, whereas in Fig. 1 it includes the coils of the field-magnets, and the coils of field-magnets in Fig. 2 are arranged to be inserted in either of two normally-broken branches joining points of different potential of the main line in such manner that a current of either polarity may be directed through them precisely as a current of either polarity may be directed through the armature of the motor, as is shown in Fig. 1.

It is obvious that to cause an electric motor to change its direction of rotation the direction of current through the armature may be reversed, the field magnetism remaining the same, or that the field magnetism may, as shown in Fig. 2, be inverted, the current through the armature remaining in the same direction.

Fig. 3 represents a regulating-motor in which the armature is included in a constantly-closed branch, 11, while the field magnetism may be inverted by passing a current alternately through the branches 8 10, including the differentially-wound field-magnets. The form shown in Fig. 3 only differs from that of Fig. 2 in that in the latter the field-magnet coils are included in one wire whose ends are reversed with reference to points 12 13 of line L, while in the former case two field-coils are used whereby upon passing a current through one the field magnetism will be inverted with reference to the magnetism produced by passing a current through the other field-coil. The armature-levers $a$ $b$ are so arranged as to leave both field-coils normally open while one or the other is closed upon an increase or decrease of current in the working-circuit L, and the armature of the motor is caused to rotate in either direction required to increase or decrease the shunt resistance.

My regulating-motor and means for controlling its to and fro rotation may obviously be employed with various other devices than a field-magnet shunt for changing the electro-motive force of a dynamo-electric machine or for varying the current strength of the main line or working circuit.

In another application, No. 134,275, filed June 9, 1884, I have described and claimed a regulator for dynamo-electric machines in which two relay-magnets are employed in connection with a mechanical motor which is adapted to vary the electro-motive force of the dynamo-machine to correspond with the amount of work to be done in the working-circuit. My present invention relates specifically to the application of two relays in combination with an electro-magnetic motor as distinguished from a mechanical motor for varying the electro-motive force of the generator.

I am aware that others have employed a single electro-magnet for controlling circuits through an electro-motor for the purpose of effecting a regulation in dynamo-machines, and I therefore do not broadly claim such matter as my invention, but desire to confine my claims to the arrangement of two relay-magnets which are respectively called into operation, one upon a decrease of current in the working-circuit to cause the rotation of an electro-motor in one direction to increase the electro-motive force of the generator, and the other upon an increase of current in the working-circuit to cause the electric motor to rotate in an opposite direction and to decrease its electro-motive force.

What I claim, and desire to secure by Letters Patent, is—

1. The combination of a variable resistance in a shunt around the field-magnets of a dynamo-electric machine to vary its electro-motive force, an electric motor whose rotating armature is normally stationary but which is capable of rotation in either direction for varying said shunt resistance, and two main-line relays one of whose armature-levers normally rests on front stop and the other on a back stop and adapted to cause rotation of said motor-armature in either direction upon an increase or decrease of main-line current.

2. The combination of an adjustable resistance for varying the electro-motive force of a dynamo-electric machine, and an electric motor for controlling said resistance whose armature circuit is normally broken, two main-line relays, one of whose armature-levers normally rests on a front stop, but which, upon a decrease of main-line current is retracted to back contact, thereby completing the armature-circuit of the motor, so as to cause one polarity of current to flow therein, and the other of whose armature-levers normally rests on a back stop, but which is attracted to front contact upon an increase of main-line current, thereby closing the armature-circuit of the motor, so as to cause an opposite polarity of current to flow therethrough.

3. The combination of an electric motor having a normally-broken armature-circuit for varying the resistance of a field-magnet shunt, and two main-line relays respectively operative upon an increase and a decrease of current, one to close the armature-circuit of the motor and direct one polarity of current over it, and the other to also close said armature-circuit and direct an opposite polarity of current over the same.

4. The combination of an electric motor having a normally-broken circuit for controlling the said motor, a variable resistance controlled by said motor, and two main-line relays for independently closing said motor circuit and directing different polarities of current through the same.

5. The combination of a dynamo-electric machine, an electric motor for varying the electro-motive force of said dynamo-machine capable of rotation in either direction, and two main-line relays and electrical circuits, one of which is closed by one relay to cause rotation in one direction, while a second circuit is closed by the other relay to cause rotation in the opposite direction.

6. The combination of two main-line electro-magnets, responsive, respectively, to strong and weak currents, an electric motor whose armature rotation in one direction is controlled by one of said electro-magnets, and whose armature rotation in the opposite direction is controlled by the other of said electro-magnets, and a dynamo-machine regulator controlled by said motor for varying the strength of current of the working-circuit.

CHARLES L. BUCKINGHAM.

Witnesses:
WM. ARNOUX,
S. S. WATTERS.